United States Patent
Ishihara

(10) Patent No.: US 7,442,244 B2
(45) Date of Patent: Oct. 28, 2008

(54) WATER-BASE INK COMPOSITION

(75) Inventor: Daisuke Ishihara, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 11/084,073

(22) Filed: Mar. 18, 2005

(65) Prior Publication Data

US 2005/0235870 A1   Oct. 27, 2005

(30) Foreign Application Priority Data

| Mar. 22, 2004 | (JP) | ............................. 2004-082723 |
| Mar. 24, 2004 | (JP) | ............................. 2004-087632 |
| Mar. 18, 2005 | (JP) | ............................. 2005-079958 |

(51) Int. Cl.
C09D 11/02 (2006.01)

(52) U.S. Cl. .............. 106/31.58; 106/31.86; 106/31.89; 106/31.59

(58) Field of Classification Search .............. 106/31.58, 106/31.86, 31.89, 31.59
See application file for complete search history.

(56) References Cited

U.S. PATENT DOCUMENTS

| 6,204,307 | B1 * | 3/2001 | Miyabayashi ................ 523/160 |
| 6,637,875 | B2 * | 10/2003 | Kaneko et al. ............... 347/100 |
| 6,695,443 | B2 * | 2/2004 | Arita et al. ................... 347/100 |
| 2002/0096085 | A1 * | 7/2002 | Gotoh et al. ............. 106/31.86 |
| 2002/0107303 | A1 * | 8/2002 | Miyabashi et al. .......... 523/160 |
| 2003/0107632 | A1 * | 6/2003 | Arita et al. ................... 347/100 |
| 2004/0196345 | A1 * | 10/2004 | Hall et al. .................... 347/100 |

FOREIGN PATENT DOCUMENTS

| EP | 0 624 470 | 11/1994 |
| EP | 0 704 504 | 4/1996 |
| EP | 0 947 569 | 10/1999 |
| JP | 4-239068 | 8/1992 |
| JP | 6-157959 | 6/1994 |
| JP | 6-322307 | 11/1994 |
| JP | 8-157760 | 6/1996 |
| JP | 8-259869 | 10/1996 |
| JP | 8-283633 | 10/1996 |
| JP | 9-39381 | 2/1997 |
| JP | 9-169160 | 6/1997 |
| JP | 11-10851 | 1/1999 |
| JP | 11-323235 | 11/1999 |
| JP | 2001-63202 | 3/2001 |
| JP | 2003-3100 | 1/2003 |
| JP | 2004-66599 | 3/2004 |

OTHER PUBLICATIONS

Definition of miscibility, Hawley's Condensed Chemical Dictionary 13th edition.*
Computer-Generated English Translation of Specification and Claims and Patent Abstracts of Japan of JP 2004-66599 dated Mar. 4, 2004.
Computer-Generated English Translation of Specification and Claims and Patent Abstracts of Japan of JP 2003-3100 dated Jan. 8, 2003.
Computer-Generated English Translation of Specification and Claims and Patent Abstracts of Japan of JP 2001-63202 dated Mar. 13, 2001.
Computer-Generated English Translation of Specification and Claims and Patent Abstracts of Japan of JP 11-10851 dated Jan. 19, 1999.
Computer-Generated English Translation of Specification and Claims and Patent Abstracts of Japan of JP 9-169160 dated Jun. 30, 1997.
Computer-Generated English Translation of Specification and Claims and Patent Abstracts of Japan of JP 8-259869 dated Oct. 8, 1996.
Computer-Generated English Translation of Specification and Claims and Patent Abstracts of Japan of JP 8-283633 dated Oct. 29, 1996.
Computer-Generated English Translation of Specification and Claims and Patent Abstracts of Japan of JP 8-157760 dated Jun. 18, 1996.
Computer-Generated English Translation of Specification and Claims and Patent Abstracts of Japan of JP 6-157959 dated Jun. 7, 1994.
Patent Abstracts of Japan of JP 4-239068 dated Aug. 26, 1992.

* cited by examiner

*Primary Examiner*—Jerry Lorengo
*Assistant Examiner*—Veronica Faison Gee
(74) *Attorney, Agent, or Firm*—Ladas & Parry LLP

(57) ABSTRACT

There is provided a water-base ink composition which has excellent ejection stability and can be evenly printed on recording media. The water-base ink composition comprises at least: a colorant component selected from dyes and pigments; a monovalent or divalent branched alcohol with C5 to C10 chain length; an acetylene glycol surfactant and/or a penetrating organic solvent; a humectant; and water. The monovalent or divalent branched alcohol with C5 to C10 chain length, the acetylene glycol surfactant and/or the penetrating organic solvent, and the humectant are selected from combinations of branched alcohols, acetylene glycol surfactants and/or penetrating organic solvents, and humectants which are miscible with one another.

12 Claims, No Drawings

WATER-BASE INK COMPOSITION

BACKGROUND OF THE INVENTION

1. Field of the Invention

The present invention relates to a water-base ink composition comprising a colorant component, selected from dyes or pigments, an alcohol, a surfactant and/or a penetrating organic solvent, a humectant, a resin emulsion, and water.

2. Background Art

Ink jet recording is a printing method wherein droplets of ink are ejected and deposited on recording media, such as paper, to perform printing. The feature of the ink jet recording method is that images having a combination of high resolution with high quality can be printed at a high speed by means of a relatively inexpensive apparatus.

Ink compositions used in ink jet recording generally comprise water as a main ingredient and, added to water, a colorant component and a humectant, such as glycerin, for clogging preventive purposes and the like. A large number of water soluble dyes have been used as the colorant component for the ink composition for ink jet recording, for example, from the viewpoints of high chroma of the coloring material, a wide variety of usable coloring materials, and solubility in water.

On the other hand, in recent years, the use of pigments as a colorant component in water-base inks for ink jet recording has been studied from the viewpoint of realizing an improvement in weatherfastness properties, such as lightfasthness, gasfastness, and waterfastness, of records that cannot be attained by water soluble dyes without difficulties.

In order to yield sharp images, simultaneously satisfying requirements, for example, for printing properties such as a high level of color development and a low level of bleeding, a high level of penetrating properties which can cope with high-speed printing, and ejection stability properties free from droplet trajectory directionality problems of ink ejected from head nozzles is required of water-base inks for ink jet recording.

However, it should be noted that an increase in penetrating properties of ink to a very high level is disadvantageous in that, since the ink penetrates into a recording medium, the ink is less likely to stay on the surface of the recording medium, leading to a deterioration in homogeneity of filled images. Further, some combination with a water soluble organic solvent or a surfactant used results in unstable ink ejection.

To overcome these problems, Japanese Patent Laid-Open Nos. 239068/1992 and 322307/1994 propose the use of an acetylene glycol surfactant to regulate the penetrability of ink into recording media. Further, Japanese Patent Laid-Open Nos. 3100/2003 and 192969/2003 propose the addition of a monovalent or divalent branched alcohol with a specific chain length from the viewpoint of improving the penetrability of ink into recording media. Furthermore, for example, Japanese Patent Laid-Open No. 96345/2003 discloses an ink composition with a predetermined viscosity comprising a specific divalent alcohol and a penetrating agent.

In water-base ink compositions for use in ink jet recording, in addition to the colorant component, various additives, particularly water soluble organic solvents, are added from the viewpoint of optimizing various properties required of inks. Regarding the water soluble organic solvent, for example, humectants for preventing ink from drying, penetrating organic solvents or, surfactants for suppressing ink penetration, and organic amines for pH adjustment are added to ink.

When monovalent or divalent branched alcohols with a specific chain length are used, however, some combination thereof with other organic solvents or surfactants has sometimes resulted in unstable ink ejection. Further, there is a demand for improved color development on plain paper.

SUMMARY OF THE INVENTION

The present inventors have now found that a combination of specific alcohol, acetylene glycol surfactant and/or penetrating organic solvent, and humectant can provide a water-base ink composition which can be highly stably ejected and, at the same time, can be evenly printed on recording media. The present invention has been made based on such finding.

Accordingly, an object of the present invention is to provide a water-base ink composition which can be highly stably ejected and, at the same time, can be evenly printed on recording media.

According to one aspect of the present invention, there is provided a water-base ink composition comprising at least: a colorant component selected from dyes or pigments; a monovalent or divalent branched alcohol with C5 to C10 chain length; an acetylene glycol surfactant and/or a penetrating organic solvent; a humectant; and water, said monovalent or divalent branched alcohol with C5 to C10 chain length, said acetylene glycol surfactant and/or said penetrating organic solvent, and said humectant being selected from combinations of monovalent or divalent branched alcohols with C5 to C10 chain length, acetylene glycol surfactants and/or penetrating organic solvents, and humectants which are miscible with one another.

According to the present invention, by virtue of the feature of the combination of the monovalent or divalent branched alcohol with C5 to C10 chain length, the acetylene glycol surfactant and/or the penetrating organic solvent, and the humectant as ingredients of ink that they are fully dissolved in one another, insolubles are less likely to be formed at the front end part of ink jet nozzles, whereby the occurrence of ink droplet trajectory directionality and clogged nozzle problems can be prevented. In this ink comprising a component of ingredients which are miscible with one another, even though ink, which accidentally stays at the front end of nozzles, is dried, the dried product can be redissolved upon supply of ink. Therefore, the occurrence of ink droplet trajectory directionality and clogged nozzle problems can be effectively prevented. In particular, when a pigment, which as such is not dissolved in ink, is used as a colorant component, the occurrence of ink droplet trajectory directionality and clogged nozzle problems can be very effectively prevented.

DETAILED DESCRIPTION OF THE INVENTION

The water-base ink composition according to the present invention comprises a colorant component, a monovalent or divalent branched alcohol with C5 to C10 chain length, an acetylene glycol surfactant and/or a penetrating organic solvent, a humectant, and water as indispensable ingredients. The monovalent or divalent branched alcohol with C5 to C10 chain length, the acetylene glycol surfactant and/or the penetrating organic solvent, and the humectant are selected from combinations of monovalent or divalent branched alcohols with C5 to C10 chain length, acetylene glycol surfactants and/or penetrating organic solvents, and humectants which are miscible with one another. The expression "combination of . . . which are miscible with one another" refers to a combination of the ingredients constituting the ink composition except for the colorant component, that is, water, the monovalent or divalent branched alcohols with C5 to C10 chain length, the acetylene glycol surfactant and/or the penetrating organic solvent, and the humectant, and proportions of these materials such that a mixture of water, the monovalent or divalent branched alcohol with C5 to C10 chain length, the acetylene glycol surfactant and/or the penetrating organic solvent, and the humectant is fully dissolved.

Each of the ingredients constituting the water-base ink composition according to the present invention will be described.

Monovalent or Divalent Branched Alcohol with C5 to C10 Chain Length

The monovalent or divalent branched alcohol with C5 to C10 chain length has excellent properties as a penetrating component, and the water-base ink composition containing this specific alcohol can render the wetting capability and the penetration speed substantially equal to each other independently of the type of recording media.

Monovalent branched alcohols with C5 to C10 chain length usable in the present invention include 2-methyl-1-butanol, 2-ethyl-1-butanol, 3-methyl-2-butanol, tert-pentyl alcohol, neopentyl alcohol, 2,3-dimetyl-2-butanol, 3,3-dimetyl-2-butanol, 2,4-dimethyl-3-pentanol, 3-ethyl-3-pentanol, 2-methyl-2-pentanol, 4-methyl-2-pentanol, 2,4,4-trimethyl-1-pentanol, 2,2-dimethyl-3-pentanol, 4-methyl-1-pentanol, 3-methyl-2-pentanol, 2-methyl-3-pentanol, 3-methyl-1-pentanol, 2-ethylhexanol, 2-methyl-2-hexanol, and 2-methyl-3-hexanol.

Divalent branched alcohols with C5 to C10 chain length usable in the present invention include 2-methyl-2-propyl-1,3-propanediol, 2-butyl-2-ethyl-1,3-propanediol, 2,2-diethyl-1,3-propanediol, 2,2,3-trimethyl-1,3-propanediol, 2,2-dimethyl-1,3-propanediol, 2,2-diethyl-1,3-propanediol, 3,3-diethyl-1,2-butanediol, 2-methyl-2,4-pentanediol, 2,2,4-trimethyl-1,3-pentanediol, 2,5-diethyl-2,5-hexanediol, and 2-ethyl-1,3-hexanediol.

In the present invention, among the above alcohols, 2-ethyl-1,3-hexanediol is preferred. 2-Eethyl-1,3-hexanediol can also function as a humectant for suppressing drying of ink. Accordingly, there is no need to add a humectant which will be described later, and, thus, the amount of solvents other than water used in the ink can be reduced. As a result, the content of colorant component in the ink can be increased, and, thus, water-base inks having a high level of color development can be realized.

In the present invention, the amount of the monovalent or divalent branched alcohol with C5 to C10 chain length added is preferably 0.1 to 10% by weight, more preferably 0.5 to 50% by weight, based on the total amount of the ink. When the addition amount is less than 0.1% by weight, the penetrating property and the drying property of the water-based ink composition are disadvantageously poor, making it difficult to yield sharp images. On the other hand, when the addition amount is more than 10% by weight, the alcohol is not stably dissolved in the ink, and, consequently, troubles associated with reliability, for example, storage stability of ink, ink jet nozzle clogging, and occurrence of unstable ejection, sometimes take place.

Acetylene Glycol Surfactant

The water-base ink composition according to the present invention comprises an acetylene glycol surfactant in addition to the monovalent or divalent branched alcohol with C5 to C10 chain length. As with the penetrating organic solvent which will be described later, the acetylene glycol surfactant is an additive for improving the penetration of ink into recording media. Among acetylene glycol surfactants, acetylene glycol nonionic surfactants are particularly useful when the water-base ink composition is applied to ink jet recording, because the acetylene glycol nonionic surfactants have little or no foamability. Specific examples of acetylene glycol nonionic surfactants which may be preferably used in the present invention include Surfynol 61, Surfynol 82, Surfynol 104, Surfynol 440, Surfynol 465, Surfynol 485, and Surfynol TG (manufactured by Air Products and Chemicals, Inc.) and OLFINE STG and OLFINE E 1010 (manufactured by Nissin Chemical Industry Co., Ltd.).

The amount of the acetylene glycol nonionic surfactant added may be properly determined by taking desired ink drying time into consideration. Preferably, however, the addition amount is 0.01 to 10% by weight based on the total amount of the ink.

In the present invention, even though the acetylene glycol surfactant has low solubility in water, the amount of the acetylene glycol surfactant added to the ink can be increased because the acetylene glycol surfactant is miscible with other ink ingredients.

Further, the combined use of these acetylene glycol surfactants and the monovalent or divalent branched alcohol with C5 to C10 chain length can improve the wetting property and penetration speed of the ink independently of the type of recording media, and, thus, inks which are particularly excellent in penetration and drying properties can be advantageously realized.

Penetrating Organic Solvent

The water-base ink composition according to the present invention comprises a penetrating organic solvent in addition to the monovalent or divalent branched alcohol with C5 to C10 chain length. The term "penetrating organic solvent" as used herein refers to an additive for accelerating the penetration of ink into recording media. This penetrating organic solvent can be properly selected by taking into consideration the desired ink drying time.

The penetrating organic solvent is preferably selected from glycol monoether derivatives of polyhydric alcohols and 1,2-alkyldiols. This type of penetrating organic solvent can function to lower the surface tension of the water-base ink composition. In the present invention, the combined use of the specific alcohol and acetylene glycol surfactant and this penetrating organic solvent can improve the wetting property and penetration speed of the ink independently of the type of recording media, and, thus, inks which are particularly excellent in penetration and drying properties can be advantageously realized. Further, a combination of these three ingredients can realize sharp images with a high level of color development independently of the type of the colorant component.

Preferred 1,2-alkyldiols include 1,2-alkyldiols with 4 to 8 carbon atoms, for example, butanediol, pentanediol, hexanediol, heptanediol, and octanediol. 1,2-Hexanediol, 1,2-heptanediol, and 1,2-octanediol which contain 6 to 8 carbon atoms are particularly preferred because of their high level of penetration into recording media. The amount of the 1,2-alkyldiol added is preferably in the range of 0.25 to 5% by weight based on the total amount of the water-base ink composition.

Polyhydric alcohol derivatives in which the alkyl group contains 3 or more carbon atoms are particularly preferred as the glycol monoether derivative of polyhydric alcohol. Specific examples thereof include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methy-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

The amount of the glycol monoether derivative of polyhydric alcohol added is preferably in the range of 0.5 to 15% by weight based on the total amount of the ink.

Other examples of preferred penetrating organic solvents include water soluble monovalent alcohols, such as methanol, ethanol, n-propyl alcohol, iso-propyl alcohol, 2,2-dimethyl-1-propanol, n-butanol, 2-butanol, tert-butanol, iso-butanol, 2-methyl-1-butanol, 3-methyl-1-butanol, 3-methyl-2-butanol, n-pentanol, 2-pentanol, 3-pentanol, and tert-pentanol. The amount of the monohydric alcohols added is preferably in the range of 0.5 to 10% by weight based on the total amount of the ink.

The above penetrating organic solvents may be used either solely or as a combination of two or more of them. In particular, the combined use of a plurality of penetrating solvents having different structures can realize the production of images having the same quality even on various recording media different from each other in penetrating property and color development. This is advantageous from the viewpoint of coping with various types of recording media. When a water-base ink composition having a relatively long drying time is desired, humectants having relatively low surface tension which will be described later may be used as an alternative to the penetrating organic solvent. In this case, the water-base ink composition may not contain the penetrating organic solvent.

Humectant

The humectant used in the water-base ink composition according to the present invention is added for suppressing drying of ink. The addition of the humectant can suppress the vaporization of water caused by drying of the front end of printer head nozzles to suppress coagulation and solidification of water-base ink.

In the present invention, the water-base ink composition contains at least one humectant which is miscible with at least the above-described monovalent or divalent branched alcohol with C5 to C10 chain length, acetylene glycol surfactant, and penetrating organic solvent. The humectant is preferably selected from humectants particularly having a melting point of 30° C. or above, for example, diols such as 1,6-hexanediol, 1,8-octanediol, 2,2-dimethyl-1,3-propanediol, and 2,2-diethyl-1,3-propanediol, trimethylolethane and trimethylolpropane, lactams such as ε-caprolactam, urea derivatives such as urea, thiourea, and ethylene urea. The use of a water soluble humectant having a melting point of 30° C. or above can render the monovalent or divalent branched alcohol with C5 to C10 chain length, the acetylene glycol surfactant, and the penetrating organic solvent easily miscible with one another.

This humectant can be used in combination with other humectants for aiding moisture retaining capability of the water soluble humectant having a melting point of 30° C. or above.

Specific examples of other humectants include: polyols, such as glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 2,3-butanediol, 2-methyl-2,4-pentanediol, 1,2,6-hexanetriol, and pentaerythritol; and monosaccharides, disaccharides, oligosaccharides, and polysaccharides, such as glucose, mannose, fructose, ribose, xylose, arabinose, galactose, aldonic acid, glucitol, sorbit, maltose, cellobiose, lactose, sucrose, trehalose, and maltotriose. Derivatives of these saccharides include reducing sugars of the above saccharides, oxidized sugars, amino acid, and thiosugars.

The amount of these humectants added is preferably in the range of 1 to 40% by weight, more preferably 1 to 30% by weight, based on the total amount of the ink.

The amount of these humectants added is preferably properly regulated so that, in the form of an ink composition containing other ink ingredients, the viscosity of the ink at 25° C. is not more than 25 cPs, more preferably 5 to 20 cPs.

Resin Emulsion

The water-base ink composition according to the present invention preferably contains a resin emulsion. The addition of a resin emulsion to a water-base ink comprising the above ingredients, that is, a colorant component, a monovalent or divalent branched alcohol with C5 to C10 chain length, an acetylene glycol surfactant and/or a penetrating organic solvent, a humectant, and water can improve the fixation of the colorant and, at the same time, can realize a marked improvement in filled image homogeneity and color development on plain paper. Specifically, a combination of the above ingredients with the resin emulsion can realize a water-base ink which is excellent in ejection stability, as well as evenness of printing on recording media and print quality on plain paper, especially color development and fixation on plain paper. The term "resin emulsion" as used herein refers to an emulsion comprising water as a continuous phase and the following resin component as a dispersed phase.

In the present invention, the glass transition temperature of the resin emulsion is preferably 20° C. or above. The use of a resin emulsion having the above glass transition temperature can further improve the color development.

The resin component as the dispersed phase is preferably one or at least two resins selected from the group consisting of acrylic resins, methacrylic resins, styrene resins, urethane resins, acrylamide resins, and epoxy resins. These resins may be either a homopolymer or a copolymer.

In the resin emulsion used in the present invention, the resin as the dispersed phase is preferably in the form of fine particles.

The fine particles of the resin may have a single-particle structure. Alternatively, the fine particles of the resin may have a core/shell structure. The core/shell structure comprises a core and a shell surrounding the core. The term "core/shell structure" used herein refers to a form such that two or more polymers having different compositions are present in a phase separated state in a particle. Accordingly, forms of the core/shell structure usable in the present invention include a form wherein the core is entirely covered with the shell, a form wherein the core is partially covered with the shell, and a form wherein a part of the polymer constituting the shell forms a domain or the like within the core particle. Further, the particle may have a multi-layer structure of three or more layers wherein at least one additional layer having a different composition is interposed between the core and the shell.

The resin emulsion used in the present invention may be prepared by conventional emulsion polymerization. Specifically, the resin emulsion can be prepared by emulsion polymerization of an unsaturated vinyl monomer in water in the presence of a polymerization initiator and an emulsifier.

Unsaturated vinyl monomers include those commonly used in emulsion polymerization, such as acrylic ester monomers, methacrylic ester monomers, aromatic vinyl monomers, vinyl ester monomers, vinyl cyanide compound monomers, halogenated monomers, olefin monomers, and diene monomers.

Specific examples thereof include: acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, α-methylstyrene, vinyltoluene, t-butylstyrene, chlorostyrene, vinylanisole, and vinylnaphthalene; olefins, such as ethylene and propylene; dienes, such as butadiene and chloroprene; vinyl monomers, such as vinyl ether, vinyl ketone, and vinylpyrrolidone; unsaturated carboxylic acids, such as acrylic acid, methacrylic acid, itaconic acid, fumaric acid, and maleic acid; acrylamides, such as acrylamide and N,N'-dimethylacrylamide; and hydroxyl-containing monomers, such as 2-hydroxyethyl acrylate, 2-hydroxypropyl acrylate, 2-hydroxyethyl methacrylate, and 2-hydroxypropyl methacrylate.

Further, in the present invention, a structure formed by crosslinking of molecules, derived from the above monomers, with a crosslinkable monomer having two or more polymerizable double bonds may used. Examples of crosslinkable monomers having two or more polymerizable double bonds include: diacrylate compounds, such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; methylene bisacrylamide; and divinylbenzene. They may be used solely or as a mixture of two or more.

The fine particles of the resin having a core/shell structure may be produced by a conventional method, generally by multi-stage emulsion polymerization or the like, for example, by a method disclosed in Japanese Patent Laid-Open No. 76004/1992. Specific examples of unsaturated vinyl monomers used in the polymerization include those described above.

Methods for introducing an epoxy group into the core portion include a method wherein an epoxy-containing unsaturated vinyl monomer, such as glycidyl acrylate, glycidyl methacrylate, or allyl glycidyl ether, is copolymerized with other unsaturated vinyl monomer, and a method wherein, in the polymerization of at least one unsaturated vinyl monomer to prepare core particles, an epoxy compound is simultaneously added to form a composite structure. The former method is preferred from the viewpoints of easiness of the polymerization, polymerization stability and the like.

The polymerization initiator, the emulsifier, and the molecular weight modifier may be used in the emulsion polymerization by the conventional method.

The polymerization initiator may be the same as that used in the conventional radical polymerization, and examples thereof include potassium persulfate, ammonium persulfate, hydrogen peroxide, azobisisobutyronitrile, benzoyl peroxide, dibutyl peroxide, peracetic acid, cumene hydroperoxide, t-butyl hydroxyperoxide, and paramenthane hydroxyperoxide. In particular, as described above, in the case of a polymerization reaction in water, the use of a water soluble polymerization initiator is preferred.

Emulsifiers include, for example, sodium laurylsulfate and, in addition, compounds commonly used as anionic surfactants, nonionic surfactants, or amphoteric surfactants, and mixtures thereof. They may be used either solely or as a mixture of two or more.

In producing the resin emulsion by emulsion polymerization, in particular, in producing the resin emulsion comprising fine particles of an anionic resin by emulsion polymerization, since negative polar groups such as carboxyl or sulfonic acid groups are present on the surface of the fine particles of the resin, pH is likely to be on the acidic side and, thus, an increase in viscosity and coagulation are likely to occur. Accordingly, neutralization with a basic substance is generally carried out. Basic substances include ammonia, organic amines, and inorganic hydroxides. Among them, monovalent inorganic hydroxides (potassium hydroxide, sodium hydroxide, and lithium hydroxide) are particularly preferred from the viewpoints of long-term storage stability and ejection stability of the polymer emulsion and the water-base ink composition. The amount of the neutralizing agent added is properly determined so that the polymer emulsion has a pH value in the range of 7.5 to 9.5, preferably in the range of 7.5 to 8.5.

In the present invention, the resin emulsion may be mixed as powder of fine particles with other ingredients in the water-base ink composition. More preferably, however, the fine particles of the resin is dispersed in a water medium to prepare a resin emulsion which is then mixed with other ingredients in the water-base ink composition.

The particle diameter of the fine particles of the resin preferred in the present invention is in the range of 5 to 400 nm, more preferably in the range of 50 to 200 nm, from the viewpoints of long-term storage stability and ejection stability of the ink composition.

In the present invention, the amount of the resin is preferably in the range of 0.1 to 30% by weight, more preferably in the range of 0.3 to 15% by weight, based on the total amount of the water-base ink composition. When the addition amount is less than 0.1% by weight, the desired fixation is sometimes unsatisfactory. On the other hand, when the addition amount exceeds 30% by weight, there is a fear of causing unfavorable phenomena a rapid increase in viscosity, unstable ejection and the like.

Colorant Component

Dyes, pigments which have been dispersed with the aid of a water soluble resins, or surface treated pigments which have been surface-modified and can be dispersed without the aid of any resin may be mentioned as the colorant component.

The type of dyes is not particularly limited, and suitable dyes usable herein include those that are water soluble organic color materials and fall into categories of acidic dyes, direct dyes, reactive dyes, soluble vat dyes, and food dyes according to the color index. Even in the case of colorants insoluble in neutral water, they can be used as the colorant component so far as they are soluble in alkaline water and are categorized in oil soluble dyes and basic dyes according to the color index.

Specific examples of yellow dyes include: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; C.I. Food Yellow 3 and 4; and C.I. Solvent Yellow 15, 19, 21, 30, and 109.

Specific examples of red dyes include: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; C.I. Solubilized Red 1; and C.I. Food Red 7, 9, and 14.

Specific examples of blue dyes include: C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; C.I. Solubilized Vat Blue 1, 5, and 41; C.I. Vat Blue 29; C.I. Food Blue 1 and 2; and C.I. Basic Blue 9, 25, 28, 29, and 44.

Specific examples of black dyes include: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 38, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, and 18; C.I. Solubilized Vat Black 1; and C.I. Food Black 2.

These dyes may also be used either solely or as a mixture of two or more. The amount of these dyes added is preferably 0.5 to 20% by weight, more preferably 1 to 10% by weight, based on the total amount of the ink. When the content of the dye is in the range of the above-defined range, the ink can yield prints with satisfactory optical density by ink jet recording and further can easily be modified to viscosity suitable for ink jet recording. Colorants usable in the present invention are not limited to those described herein, and other colorants can be used so far as they are detrimental to the object of the present invention.

Specific examples of the pigment which has been dispersed with the aid of a water soluble resin or the surface treated pigment which has been surface-modified and can be dispersed without the aid of any resin include carbon blacks and organic pigments.

Specific examples of carbon blacks suitable for use in the present invention include: carbon blacks manufactured by Mitsubishi Chemical Corporation, for example, No. 2300, No. 900, MCF 88, No. 20B, No. 33, No. 40, No. 45, No. 52, MA 7, MA 8, MA 100, and No. 2200 B; carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Pritex 35, Pritex U, Pritex V, Pritex 140 U, Special Black 6, Special Black 5, Special Black 4A, Special Black 4 and Special Black 250; carbon blacks manufactured by Columbian Carbon Co., Ltd., for example, CONDUCTEX SC, Raven 1255, Raven 5750, Raven 5250, Raven 5000, Raven 3500, Raven 1255, and Raven 700; and carbon blacks manufactured by Cabot Corporation, for example, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12. It should be noted that they are one example of carbon blacks suitable for the present invention and the present invention is not limited to these carbon blacks only. The carbon blacks may be used either solely or as a mixture of two or more. The amount of the pigments added is preferably 0.5 to 15% by weight, more preferably 1 to 10% by weight, based on the total amount of the ink.

Organic pigments suitable for use in the present invention include: quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. Specific examples of pigments usable in the present invention are as follows.

Pigments usable for cyan ink compositions include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. Preferably, the pigment for cyan ink compositions may be one or a mixture of two or more pigments selected from the group consisting of C.I. Pigment Blue 15:3, C.I. Pigment Blue 15:4, and C.I. Pigment Blue 60. The content of these pigments in the ink composition is preferably 0.5 to 15% by weight, more preferably 1 to 10% by weight, based on the ink.

Pigments usable for magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, and C.I. Pigment Red 202, and C.I. Pigment Violet 19. Preferably, the pigment for magenta ink compositions may be one or a mixture of two or more pigments selected from the group consisting of C.I. Pigment Red 122, C.I. Pigment Red 202, C.I. Pigment Red 209, and C.I. Pigment Violet 19. The content of these pigments in the ink composition is preferably about 0.5 to 15% by weight, more preferably about 1 to 10% by weight, based on the ink.

Pigments usable for yellow ink compositions include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. Preferably, the pigment for yellow ink compositions may be one or a mixture of two or more pigments selected from the group consisting of C.I. Pigment Yellow 74, C.I. Pigment Yellow 109, C.I. Pigment Yellow 110, C.I. Pigment Yellow 128, and C.I. Pigment Yellow 138. The content of these pigments in the ink composition is preferably about 0.5 to 15% by weight, more preferably about 1 to 10% by weight, based on the ink.

Pigments usable for orange ink compositions include C.I. Pigment Orange 36 or 43 or a mixture of C.I. Pigment Orange 36 with C.I. Pigment Orange 43. The content of these pigments in the ink composition is preferably about 0.5 to 15% by weight, more preferably about 1 to 10% by weight, based on the ink.

Pigments usable for green ink compositions include C.I. Pigment Green 7 or 36 or a mixture of C.I. Pigment Green 7 with C.I. Pigment Green 36. The content of these pigments in the ink composition is preferably about 0.5 to 15% by weight, more preferably about 1 to 10% by weight, based on the ink.

The pigment which has been dispersed with the aid of a water soluble resin refers to a dispersion comprising a pigment which has been dispersed with the aid of an anionic group-containing water soluble resin. The anionic group-containing water soluble resin is an anionic group-containing polymeric compound which is self-dispersible or dissolvable in water. The anionic group-containing water soluble resin is suitably selected from water soluble resins with anionic groups such as carboxyl, sulfonic acid, or phosphonic acid groups introduced thereinto. These water soluble resins are self-dispersed or dissolved in water by forming salts with above anionic groups using, for example, organic amines or inorganic alkalis. When the water soluble resin is used, the pigment can be stably dispersed in water-base inks.

The water soluble resin is preferably an anionic acrylic dispersing resin. The anionic acrylic water soluble resin may be, for example, one prepared by polymerizing an anionic group-containing acrylic monomer (hereinafter referred to as "anionic group-containing acrylic monomer") or one prepared by copolymerizing an anionic group-containing acrylic monomer with other monomer copolymerizable with this monomer in a solvent. The anionic group-containing acrylic monomer may be, for example, an acrylic monomer containing one or more anionic groups selected from the group consisting of carboxyl, sulfonic acid, and phosphonic acid groups. Among them, carboxyl-containing acrylic monomers are particularly preferred.

Specific examples of carboxyl-containing acrylic monomers include acrylic acid, methacrylic acid, crotonic acid, ethacrylic acid, propylacrylic acid, isopropylacrylic acid, itaconic acid, fumaric acid, and maleic acid. Among them, acrylic acid or methacrylic acid and maleic acid are preferred.

Specific examples of sulfonic acid group-containing acrylic monomers include sulfoethyl methacrylate and butylacrylamidesulfonic acid.

Specific examples of phosphonic group-containing acrylic monomers include phosphoethyl methacrylate.

Specific examples of other monomers copolymerizable with anionic group-containing acrylic monomers include (meth)acrylic esters such as methyl acrylate, ethyl acrylate, isopropyl acrylate, n-propyl acrylate, n-butyl acrylate, t-butyl acrylate, 2-ethylhexyl acrylate, n-octyl acrylate, lauryl acrylate, benzyl acrylate, methyl methacrylate, ethyl methacrylate, isopropyl methacrylate, n-propyl methacrylate, n-butyl methacrylate, isobutyl methacrylate, t-butyl methacrylate, 2-ethylhexyl methacrylate, n-octyl methacrylate, lauryl methacrylate, stearyl methacrylate, tridecyl methacrylate, and benzyl methacrylate; adducts of a fatty acid with a (meth) acrylic ester monomer having an oxirane structure, such as an adduct of stearic acid with glycidyl methacrylate; adducts of an oxirane compound containing an alkyl group having 3 or more carbon atoms with (meth)acrylic acid; styrene monomers such as styrene, α-methylstyrene, o-methylstyrene, m-methylstyrene, p-methylstyrene, and p-tert-butylstyrene; itaconic esters such as benzyl itaconate; maleic esters such as dimethyl maleate; fumaric esters such as dimethyl fumarate; and acrylonitrile, methacrylonitrile, vinyl acetate, isobornyl acrylate, isobornyl methacrylate, aminoethyl acrylate, aminopropyl acrylate, methylaminoethyl acrylate, methylaminopropyl acrylate, ethylaminoethyl acrylate, ethylaminopropyl acrylate, aminoethylacrylamide, aminopropylacrylamide, methylaminoethylacrylamide, methylaminopropylacrylamide, ethylaminoethylacrylamide, ethylaminopropylacrylamide, methacrylamide, aminoethyl methacrylate, aminopropyl methacrylate, methylaminoethyl methacrylate, methylaminopropyl methacrylate, ethylaminoethyl methacrylate, ethylaminopropyl methacrylate, aminoethylmethacrylamide, aminopropylmethacrylamide, methylaminoethylmethacrylamide, methylaminopropylmethacrylamide, ethylaminoethylmethacrylamide, ethylaminopropylmethacrylamide, hydroxymethyl acrylate, 2-hydroxyethyl acrylate, 2-hydroxypropyl acrylate, hydroxymethyl methacrylate, 2-hydroxyethyl methacrylate, 2-hydroxypropyl methacrylate, N-methylolacrylamide, and allyl alcohol.

Preferably, these water soluble resins have a number average molecular weight in the range of about 1,000 to 100,000, particularly preferably in the range of about 3,000 to 50,000. When the water soluble resin is not neutralized with an alkali, it is preferably soluble in an organic solvent (for example, hydrophilic organic solvents such as acetone or methyl ethyl ketone being preferably used). When the number average molecular weight of the water soluble resin is in the above-defined range, the water soluble resin can satisfactorily function as a covering film in the pigment or a coating film in the water-base ink.

The water-soluble resin prepared by polymerizing these monomers is preferably used, in water-base inks, in the form of salts with alkali metals or organic amines. When water soluble resins in a salt form are used, excellent redispersibility and reliability can be realized. Specific examples of salts of water soluble resins with alkali metals include salts with lithium, sodium, or potassium, preferably salts with alkali metal salts such as sodium hydroxide, potassium hydroxide, or lithium hydroxide, more preferably salts with potassium hydroxide.

Specific examples of salts of water soluble resins with organic amines include salts with volatile amine compounds such as ammonia, triethylamine, tributylamine, dimethylethanolamine, diisopropanolamine, or morpholine, or salts with hardly volatile high-boiling organic amines such as diethanolamine, triethanolamine, or tripropanolamine.

The content of the anionic group in the anionic group-containing water soluble resin is such that the acid value is preferably not less than about 30 KOH mg/g, more preferably in the range of about 50 to 250 KOH mg/g. When the acid value of the water soluble resin is in the above-defined range, the waterfastness of recorded images in a coating film can be improved and, further, the storage stability of the pigment dispersion in the water-base ink can be improved.

In the dispersion as the colorant component in the present invention, the weight ratio of the pigment to the water soluble dispersing resin is preferably 10:1 to 1:10, more preferably 4:1 to 1:3. The particle diameter of the dispersion at the time of dispersing is preferably not more than 5 μm, more preferably not more than 0.3 μm (not more than 300 nm), still more preferably in the range of 0.01 to 0.15 μm (10 to 150 nm), from the viewpoint of dispersion stability.

The surface treated pigment which may be suitably used in the present invention is one prepared by subjecting the pigment to surface treatment so that, for example, carboxyl groups and salts thereof or sulfonic acid groups and salts thereof are bonded to the surface of the pigment directly and/or indirectly through an alkyl, alkyl ether, or aryl group. The surface treated pigment can be dispersed and/or dissolved in water without the aid of any water soluble resin. More specifically, this surface treated pigment may be prepared by grafting a functional group or a molecule containing a functional group onto the surface of the pigment by physical treatment, such as vacuum plasma, or chemical treatment with an oxidizing agent such as sodium hypochlorite or ozone.

In the present invention, a single type or a plurality of types of functional groups may be grafted onto one pigment particle. The type of the functional group to be grafted and the degree of grafting may be suitably determined by taking the dispersion stability in the ink, the color density, the drying property at the front face of the ink jet head and the like into consideration.

The surface treated pigment used in the present invention may be prepared by a method described, for example, in Japanese Patent Laid-Open No. 3498/1996.

Preferably, these pigments have an average particle diameter in the range of 50 to 250 nm, for example, from the viewpoints of storage stability of the water-base ink composition and nozzle clogging prevention.

Water and Other Ingredients

Water used in the water-base ink composition according to the present invention may be pure water obtained by ion exchange, ultrafiltration, reverse osmosis, distillation or the like, or ultrapure water from the viewpoint of minimizing ionic impurities.

Further, water, which has been sterilized, for example, by ultraviolet irradiation or by addition of hydrogen peroxide, is preferred because, when the water-base ink composition is stored for a long period of time, it can prevent the growth of mold and bacteria.

When the water-base ink composition according to the present invention contains the above ingredients, water-base inks can be realized which have excellent ejection stability, can be evenly printed on recording media, and can realize excellent print quality on plain paper, especially are excellent in color development and pigment fixation. If necessary, various properties can be further improved by incorporating the following ingredients.

If necessary, additives commonly used in ink jet recording inks may be added to the water-base ink composition according to the present invention.

Optional additives include antioxidants, ultraviolet absorbers, preservatives, fungicides, or other additives.

Antioxidants/ultraviolet absorbers include: allophanates, such as allophanate and methyl allophanate; biurets, such as biuret, dimethylbiuret, and tetramethylbiuret; L-ascorbic acid and salts thereof; Tinuvin 328, 900, 1130, 384, 292, 123, 144, 622, 770, and 292, Irgacor 252 and 153, and Irganox 1010, 1076, 1035, and MD 1024, manufactured by Ciba-Geigy; and lanthanide oxides.

The preservative or fungicide may be selected, for example, from sodium benzoate, pentachlorophenol sodium, 2-pyridinethiol-1-oxide sodium, sodium sorbate, sodium dehydroacetate, and 1,2-dibenzothiazolin-3-one.

Method for Dispersion of Colorant Component

A suitable method for dispersing carbon black or an organic pigment, among the colorant components in the present invention, with the aid of the water soluble resin will be described. An anionic group-containing water-soluble resin is first dissolved or dispersed in alkaline water containing an alkaline compound such as an organic amine or an alkali metal salt compound. Subsequently, a pigment dispersion can be prepared by mixing this liquid with the pigment and dispersing the mixture by means of a dispergator, for example, a ball mill, a sand mill, an attritor, a roll mill, an agitator mill, a Henschel mixer, a colloid mill, an ultrasonic homogenizer, a jet mill, or an angmill. More preferably, from the viewpoint of more strongly bonding the pigment and the water soluble resin to each other for dispersion stabilization, the pigment dispersion may also be produced by methods disclosed in Japanese Patent Laid-Open No. 151342/1997, 140065/1998, 209672/1999, 172180/1999, 25440/1998, 43636/1999, or 247810/2001.

One embodiment of the production process of a colorant component dispersion will be described.

Japanese Patent Laid-Open Nos. 247810/2001, 151342/1997, and 140065/1998 disclose "phase inversion method" and "salting-out method" as the production process of the pigment dispersion.

a) "Phase inversion method"

The term "phase inversion method" as used herein basically refers to a self-dispersion (phase inversion emulsification) method in which a mixed melt comprised of a water soluble resin having self-dispersivity or dissolvability and a pigment is dispersed in water. The term "mixed melt" as used herein refers to an undissolved and mixed state or a dissolved mixed state, or both the above states.

One specific example comprises the steps of:

(1) adding a pigment, a neutralizing agent, a minor amount of water to a dispersing resin precursor (for example, the above-described anionic group-containing water soluble resin)/solvent solution to prepare a solvent-based slurry, (2) conducting dispersing while adding the slurry to a large amount of water to prepare a water-based slurry, and (3) removing the solvent used for dissolving the water soluble resin from the water-based slurry to prepare a pigment-containing resin particle dispersion comprising the pigment included in the water-dispersed resin.

b) "Salting-out method"

In the present invention, the "salting-out method" refers to a method in which a hydrous cake comprising a water soluble resin and a pigment is provided and a part of the unneutralized group contained in the water soluble resin in the hydrous cake is neutralized with a neutralizing agent to prepare a pigment.

When the unneutralized group is an anionic acid group and the neutralizing agent is a basic compound, a specific example of the salting-out method comprises the steps of:

(1) dispersing a water soluble resin and a pigment in an alkaline aqueous medium and optionally heating the dispersion to bring the water soluble resin to gel, (2) adjusting pH to a neutral or acidic pH value to hydrophobilize the water soluble resin and, thus, to strongly fix the water soluble resin to the pigment, (3) if necessary, conducting filtration and washing with water to give hydrous cake, (4) neutralizing a part or the whole of anionic groups contained in the water soluble resin in the hydrous cake with a basic compound followed by redispersion in an aqueous medium, and (5) if necessary, heat-treating the dispersion to bring the water soluble resin to gel.

More specific production processes utilizing the "phase inversion method" and the "salting-out method" may be the same as disclosed in Japanese Patent Laid-Open Nos. 151342/1997 and 140065/1998.

Further, a production process of a colorant component is disclosed in Japanese Patent Laid-Open Nos. 209672/1999 and 172180/1999. This production process basically comprises the steps of:

(1) mixing an anionic group-containing resin or a solution of the anionic group-containing resin in an organic solvent with a basic compound to neutralize the anionic group-containing resin, (2) mixing a pigment into this mixed liquid to prepare a suspension and then dispersing the pigment by means of a dispergator or the like to prepare a pigment dispersion, (3) if necessary, removing the solvent by distillation, (4) adding an acidic compound to precipitate the anionic group-containing water soluble resin to coat the pigment with the anionic group-containing water soluble resin, (5) if necessary, conducting filtration and washing with water, and (6) adding a basic compound to neutralize the anionic group in the anionic group-containing water soluble resin and thus to disperse the resin in an aqueous medium to prepare an aqueous dispersion.

Further, in the present invention, a preferred method for dispersing carbon black or an organic pigment by surface treatment is surface treatment means in which the functional group as a hydrophilic dispersibility imparting group or its salt introduced into the surface of the pigment particle either directly or through a polyvalent group. To this end, various conventional surface treatment means can be applied.

Examples of conventional surface treatment means include:

(a) means in which ozone or a sodium hypochlorite solution is allowed to act on a commercially available oxidized carbon black to further oxidize the carbon black and thus to render the surface of the carbon black more hydrophilic (for example, Japanese Patent Laid-Open Nos. 258578/1995, 3498/1996, 120958/1998, 195331/1998, and 237349/1998);

(b) means in which carbon black is treated with a 3-amino-N-alkyl-substituted pyridium bromide (for example, Japanese Patent Laid-Open Nos. 195360/1998 and 330665/1998);

(c) means in which an organic pigment is dispersed in a solvent in which the organic pigment is insoluble or hardly soluble, and sulfone groups are introduced into the surface of the pigment particle by using a sulfonating agent (for example, Japanese Patent Laid-Open Nos. 283596/1996, 110110/1998, and 110111/1998);

(d) means in which an organic pigment is dispersed in a basic solvent which, together with sulfur trioxide, forms a complex, and sulfur trioxide is added to treat the surface of the organic pigment to introduce sulfone groups or sulfonamino groups (for example, Japanese Patent Laid-Open No. 110114/1998); and (e) means in which water solubilization functional groups and a water soluble resin are introduced into the surface of the pigment through a phenylene group bonded to carbon black by an azocoupling reaction (for example, Japanese Patent Laid-Open No. 53902/2000).

The means for preparing the surface treated pigment used in the present invention, however, is not limited to the above means (a) to (e).

Production Process of Water-Base Ink Composition

A water-base ink composition can be suitably produced by adding, to the colorant component thus obtained, a monovalent or divalent branched alcohol with C5 to C10 chain length, a humectant, a penetrating organic solvent and/or an acetylene glycol surfactant, and water and optionally other ingredients.

Preferably, the water-base ink composition thus obtained has an ink viscosity at 25° C. of 5 to 20 cPs, more preferably 6 to 15 cPs. The conventional ink jet recording ink has an ink viscosity at 25° C. of about 3 cPs, and the water content of the low-viscosity ink is about 70%. In the present invention, when the ink viscosity is in the above-defined range, the water content of the ink can be brought to not more than 50%. Therefore, the water evaporative rate at the time when ink droplets impact the top of the recording medium is 2 to 3 times higher than that in the conventional ink. As a result, the highly concentrated pigment is rapidly coagulated on the recording medium, and, thus, images having excellent color development can be realized.

Ink Jet Recording Method and Record

The ink jet recording method according to the present invention may be any method so far as the water-base ink composition is ejected as fine droplets through nozzles and the droplets are deposited on a recording medium. An example of the ink jet recording method is a static electricity-driven ejection method. In this method, an intense electric field is applied across the nozzle and an accelerating electrode disposed in front of the nozzle, the water-base ink composition is continuously ejected as droplets through the nozzle, and, during a period in which the ink droplets are projected between deflecting electrodes, printing information signals are sent to the deflecting electrodes for recording, or alternatively ink droplets are ejected in response to printing information signals without deflection.

A method in which pressure is applied to an ink liquid by means of a small pump and nozzles are mechanically vibrated, for example, by a quartz oscillator to forcibly eject ink droplets through the nozzles may be mentioned as another ink jet recording method. The ejected ink droplets are electrified simultaneously with the ejection, and, during a period in which the ink droplets are projected between deflecting electrodes, printing information signals are sent to the deflecting electrodes for recording.

A method using a piezoelectric element may be mentioned as still another ink jet recording method. In this method, pressure and printing information signals are simultaneously applied to an ink liquid by a piezoelectric element to eject ink droplets for recording.

A further ink jet recording method is a method in which the volume of an ink liquid is rapidly expanded through the action of thermal energy. In this method, an ink liquid is heat-foamed by microelectrodes in response to printing information signals to eject ink droplets for recording.

Among the above various ink jet recording methods, particularly a combination of a method, in which printing is carried out at a relatively low ink ejection rate of not more than 10 m/sec, with the water-base ink composition according to the present invention can prevent the deposition of the water-base ink composition on ejection nozzles and thus can realize stable ink jet recording.

The record according to the present invention can be produced by printing the above water-base ink composition by the ink jet recording method.

EXAMPLES

The present invention will be described in more detail with reference to the following Examples. However, it should be noted that the scope of the present invention is not limited to these Examples only.

<Preparation of Dispersions>

(1) Dispersion K1

MA 100 (tradename, manufactured by Mitsubishi Chemical Corporation) (75 g) as carbon black, 25 g of Joncryl 611 (tradename, manufactured by Johnson Polymer Corp., average molecular weight 8100, acid value 53 KOH mg/g) as a styrene-acrylic acid water soluble resin containing carboxylic acid groups as an anionic group, 1.40 g of potassium hydroxide, and 250 g of ultrapure water purified by an ion exchange method and a reverse osmosis method were mixed together, and the mixture, together with zirconia beads, was dispersed in a ball mill for 10 hr. The dispersion stock thus obtained was filtered through a membrane filter with a pore diameter of about 8 μm (tradename, manufactured by Nihon Millipore, Ltd.) to remove coarse particles and was diluted with ultrapure water to a pigment concentration of 15% by weight to prepare dispersion 1 which had been dispersed with the aid of a water soluble resin.

(2) Dispersion C1

A dispersion was prepared in the same manner as in dispersion K1, except that 65 g of C.I. Pigment Blue 15:3 as an organic pigment was used instead of the carbon black, the amount of the water soluble resin added was changed to 35 g, and the amount of the potassium hydroxide added was changed to 1.90 g. The dispersion thus obtained is designated as dispersion C1.

(3) Dispersion Y1

A dispersion was prepared in the same manner as in dispersion K1, except that 75 g of C.I. Pigment Yellow 74 as an organic pigment was used instead of the carbon black, the amount of the water soluble resin added was changed to 25 g, and the amount of the potassium hydroxide added was changed to 1.40 g. The dispersion thus obtained is designated as dispersion Y1.

(4) Dispersion M1

A dispersion was prepared in the same manner as in dispersion K1, except that 80 g of C.I. Pigment Red 122 as an organic pigment was used instead of the carbon black, the amount of the water soluble resin added was changed to 20 g, and the amount of the potassium hydroxide added was changed to 1.10 g. The dispersion thus obtained is designated as dispersion M1.

(5) Dispersion K2

MA 100 (tradename, manufactured by Mitsubishi Chemical Corporation) (75 g) as carbon black, 25 g of Joncryl 678 (tradename, manufactured by Johnson Polymer Corp., average molecular weight 8500, acid value 215 KOH mg/g) as a styrene-acrylic acid water soluble resin containing carboxylic acid groups as an anionic group, 5.40 g of potassium hydroxide, and 250 g of ultrapure water purified by an ion exchange method and a reverse osmosis method were mixed together, and the mixture, together with zirconia beads, was dispersed in a ball mill for 10 hr. The dispersion stock thus obtained was filtered through a membrane filter with a pore diameter of about 8 μm (tradename, manufactured by Nihon Millipore, Ltd.) to remove coarse particles and was diluted with ultrapure water to a pigment concentration of 15% by weight to prepare dispersion K2 which had been dispersed with the aid of a water soluble resin.

(6) Dispersion C2

A dispersion was prepared in the same manner as in dispersion K2, except that 40 g of C.I. Pigment Blue 15:4 as an organic pigment was used instead of the carbon black, the amount of the water soluble resin added was changed to 40 g, and the amount of the potassium hydroxide added was changed to 9.0 g. The dispersion thus obtained is designated as dispersion C2.

(7) Dispersion Y2

A dispersion was prepared in the same manner as in dispersion K2, except that 60 g of C.I. Pigment Yellow 74 as an organic pigment was used instead of the carbon black, the amount of the water soluble resin added was changed to 20 g, and the amount of the potassium hydroxide added was changed to 1.10 g. The dispersion thus obtained is designated as dispersion Y2.

(8) Dispersion M2

A dispersion was prepared in the same manner as in dispersion K2, except that 64 g of C.I. Pigment Red 122 as an organic pigment was used instead of the carbon black, the amount of the water soluble resin added was changed to 16 g, and the amount of the potassium hydroxide added was changed to 0.9 g. The dispersion thus obtained is designated as dispersion M2.

(9) Dispersion K3

Carbon black MA-7 (manufactured by Mitsubishi Chemical Corporation) (12 parts by weight) was mixed with 600 parts by weight of a 5% sodium hypochlorite solution, and the mixture was heated under reflux at 80 to 95° C. for 10 hr. Thereafter, washing with water and centrifugation were repeated, and the solution was then adjusted to pH 1 by the addition of hydrochloric acid and was desalted with a reverse osmosis membrane. The stock solution thus obtained was filtered through a membrane filter with a pore diameter of about 8 μm (tradename, manufactured by Nihon Millipore, Ltd.) to remove coarse particles. The solution was adjusted to pH 8 by the addition of triethanolamine to prepare a surface treated carbon black dispersion with a pigment concentration of 15% by weight.

(10) Dispersion C3

Phthalocyanine pigment (C.I. Pigment Blue 15:3) (3 parts by weight) was added to 100 parts by weight of fuming sulfuric acid ($SO_3$ concentration 25%) of 5 to 10° C. with stirring over a period of 15 min. The mixture thus obtained was stirred at 70 to 90° C. for a few hr and was then poured into ice water. The resultant suspension was filtered and washed and was then adjusted to pH 8.2 by the addition of triethanolamine to prepare a sulfonated phthalocyanine pigment dispersion with a pigment concentration of 18% by weight.

<Preparation of Resin Emulsions>

(1) Resin Emulsion A

Ion-exchanged water (450 g), 3 g of sodium lauryl sulfate, 20 g of acrylamide, 500 g of styrene, 410 g of butyl acrylate, 30 g of methacrylic acid, and 2 g of ethylene glycol dimethacrylate were mixed together with stirring to prepare emulsion A. A reaction vessel equipped with a stirrer, a reflux condenser, a dropping device, and a thermometer was charged with 900 g of ion-exchanged water and 3 g of sodium lauryl sulfate, and the temperature of the mixture was raised to 70° C. with stirring while replacing the air in the reaction vessel by nitrogen. While maintaining the internal temperature at 70° C., 4 g of potassium persulfate as a polymerization initiator was added to and dissolved therein. Thereafter, emulsion A prepared above was continuously added dropwise to the contents of the reaction vessel over a period of 4 hr. After the completion of the dropwise addition of emulsion A, the mixture was ripened for 3 hr. The aqueous emulsion thus obtained was cooled to room temperature and was then adjusted to a solid content of 400% by weight and pH 8.0 by the addition of ion-exchanged water and aqueous ammonia to prepare resin emulsion A. The glass transition temperature of resin emulsion A thus obtained was measured with a differential scanning calorimeter (DSC 6220: manufactured by Seiko Instruments Inc.) and was found to be −15° C.

(2) Resin Emulsion B

Ion-exchanged water (450 g), 3 g of sodium lauryl sulfate, 20 g of acrylamide, 675 g of methyl acrylate, 235 g of butyl acrylate, and 30 g of methacrylic acid were mixed together with stirring to prepare emulsion B. A reaction vessel equipped with a stirrer, a reflux condenser, a dropping device, and a thermometer was charged with 900 g of ion-exchanged water and 3 g of sodium lauryl sulfate, and the temperature of the mixture was raised to 70° C. with stirring while replacing the air in the reaction vessel by nitrogen. While maintaining the internal temperature at 70° C., 4 g of potassium persulfate as a polymerization initiator was added to and dissolved therein. Thereafter, emulsion B prepared above was continuously added dropwise to the contents of the reaction vessel over a period of 4 hr. After the completion of the dropwise addition of emulsion B, the mixture was ripened for 3 hr. The aqueous emulsion thus obtained was cooled to room temperature and was then adjusted to a solid content of 40% by weight and pH 8.0 by the addition of ion-exchanged water and a 5% of aqueous sodium hydroxide solution to prepare resin emulsion B. The glass transition temperature of resin emulsion B thus obtained was measured in the same manner as described above, and was found to be 50° C.

(3) Resin Emulsion C

Ion-exchanged water (450 g), 3 g of sodium lauryl sulfate, 20 g of acrylamide, 810 g of methyl methacrylate, 235 g of butyl acrylate, and 30 g of methacrylic acid were mixed together with stirring to prepare emulsion C. A reaction vessel equipped with a stirrer, a reflux condenser, a dropping device, and a thermometer was charged with 900 g of ion-exchanged water and 3 g of sodium lauryl sulfate, and the temperature of the mixture was raised to 70° C. with stirring while replacing the air in the reaction vessel by nitrogen. While maintaining the internal temperature at 70° C., 4 g of potassium persulfate as a polymerization initiator was added to and dissolved therein. Thereafter, emulsion B prepared above was continuously added dropwise to the contents of the reaction vessel over a period of 4 hr. After the completion of the dropwise addition of emulsion B, the mixture was ripened for 3 hr. The aqueous emulsion thus obtained was cooled to room temperature and was then adjusted to a solid content of 40% by weight and pH 8.0 by the addition of ion-exchanged water and aqueous ammonia to prepare resin emulsion C. The glass transition temperature of resin emulsion C thus obtained was measured in the same manner as described above, and was found to be 26° C.

<Preparation of Water-Base Ink Compositions>

The dispersions and resin emulsions prepared above were added according to the formulations specified in Table 1 below, and the total amount of the mixture was brought to 100 g, followed by stirring for 2 hr and filtration through a membrane filter with a pore diameter of about 1.2 μm (tradename, manufactured by Nihon Millipore, Ltd.) to prepare water-base inks 1 to 45 (Examples 1 to 45) and water-base inks 46 to 48 (Comparative Examples 1 to 3).

The chemical compositions for the water-base inks are shown in Table 1.

TABLE 1

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Ingredients | | Addition amount, wt % | | | | | | | | | | | | | | |
| Pigment dispersion | K1 | 30 | 30 | 30 | — | — | — | — | — | — | — | — | — | 30 | — |
| | C1 | — | — | — | 40 | — | — | — | — | — | — | — | — | — | 40 |
| | M1 | — | — | — | — | 36 | — | — | — | — | — | — | — | — | — |
| | Y1 | — | — | — | — | — | 38 | — | — | — | — | — | — | — | — |
| | K2 | — | — | — | — | — | — | 30 | — | — | — | — | — | — | — |
| | C2 | — | — | — | — | — | — | — | 40 | — | — | — | — | — | — |
| | M2 | — | — | — | — | — | — | — | — | 36 | — | — | — | — | — |
| | Y2 | — | — | — | — | — | — | — | — | — | 38 | — | — | — | — |
| | K3 | — | — | — | — | — | — | — | — | — | — | 30 | — | — | — |
| | C3 | — | — | — | — | — | — | — | — | — | — | — | — | — | — |
| Dyes | C.I. Direct Black 154 | — | — | — | — | — | — | — | — | — | — | — | — | — | — |
| | C.I. Direct Blue 199 | — | — | — | — | — | — | — | — | — | — | — | — | — | — |
| | C.I. Direct Red 227 | — | — | — | — | — | — | — | — | — | — | — | — | — | — |
| | C.I. Direct Yellow 86 | — | — | — | — | — | — | — | — | — | — | — | — | — | — |
| Alcohol | 2-Ethyl-1,3-hexanediol | — | — | — | — | — | — | — | — | — | — | — | — | — | — |
| | 2-Methyl-1-butanol | 2 | 0.05 | 5.5 | 1 | 2 | — | — | — | — | 2 | — | — | — | — |
| | Neopentyl alcohol | — | — | — | — | — | 2 | — | — | — | — | 2 | — | — | — |
| | 3,3-Dimethyl-butanol | — | — | — | — | — | — | 2 | — | — | — | — | 2 | — | — |
| | 2-Methyl-2,4-pentanediol | — | — | — | 2 | — | — | — | 5 | — | — | — | — | 5 | — |
| | 2,2,4-Trimethyl-1-pentanol | — | — | — | — | — | — | — | — | 5 | — | — | — | — | 5 |
| Humectant | Glycerin | — | — | — | — | — | — | — | 2 | — | — | — | — | — | — |
| | Diethylene glycol | — | — | — | 2 | — | — | — | — | — | — | — | — | — | — |
| | Triethylene glycol | — | — | — | — | — | — | 2 | — | — | — | — | 2 | — | — |
| | Trimethylolpropane | 12 | 12 | 12 | 8 | 12 | 12 | 12 | 10 | 12 | 12 | 12 | 12 | 12 | 10 |
| | 2-Pyrrolidone | 4 | 4 | 4 | 6 | 4 | 4 | 4 | 4 | 4 | 4 | 4 | 4 | 4 | 4 |
| | 1,2-Hexanediol | — | — | — | — | — | — | — | — | — | 5 | — | 1 | — | 3 |
| | 1,2-Octanediol | — | — | — | — | — | 1 | — | — | — | — | — | 0.5 | 1 | 0.5 |

TABLE 1-continued

| | | | | | | | | | | | | | | |
|---|---|---|---|---|---|---|---|---|---|---|---|---|---|---|
| Penetrating organic solvent | Triethylene glycol monobutyl ether | — | — | — | — | — | — | 3 | — | — | — | 3 | — | — |
| | Diethylene glycol monobutyl ether | — | — | — | — | — | — | — | — | — | — | — | 3 | — |
| | iso-Propanol | — | — | — | 5 | — | — | 5 | — | — | — | 2 | — | 2 |
| | 2-Butanol | — | — | — | — | 3 | 2 | — | 5 | — | 2 | — | 3 | — |
| Acetylene surfactant | Surfynol 104 | 0.5 | 0.5 | 0.5 | 0.5 | — | — | — | 0.5 | 0.5 | 0.5 | 0.5 | 0.5 | — | 0.5 |
| | Surfynol 465 | — | — | — | 1 | — | — | — | — | 1 | — | 1 | 1 | — |
| Resin emulsion | Resin A | — | — | — | — | — | — | — | — | — | — | — | — | — |
| | Resin B | — | — | — | — | — | — | — | — | — | — | — | — | — |
| | Resin C | — | — | — | — | — | — | — | — | — | — | — | — | — |
| | Ultrapure water | Balance | Balance | Balance | Balance | Balance | Balance | Balance | Balance | Balance | Balance | Balance | Balance | Balance |

| | | Example | | | | | | | | | | | | |
|---|---|---|---|---|---|---|---|---|---|---|---|---|---|---|
| | | 15 | 16 | 17 | 18 | 19 | 20 | 21 | 22 | 23 | 10 | 25 | 26 | 27 | 28 |
| Ingredients | | Addition amount, wt % | | | | | | | | | | | | |
| Pigment dispersion | K1 | — | — | — | — | — | — | 30 | 30 | 30 | — | — | — | — | — |
| | C1 | — | — | — | — | — | — | — | — | — | 40 | — | — | — | — |
| | M1 | — | — | — | — | — | — | — | — | — | — | 36 | — | — | — |
| | Y1 | — | — | — | — | — | — | — | — | — | — | — | 38 | — | — |
| | K2 | 30 | — | — | — | — | — | — | — | — | — | — | — | 30 | — |
| | C2 | — | 40 | — | — | — | — | — | — | — | — | — | — | — | 40 |
| | M2 | — | — | — | — | — | — | — | — | — | — | — | — | — | — |
| | Y2 | — | — | — | — | — | — | — | — | — | — | — | — | — | — |
| | K3 | — | — | — | — | — | — | — | — | — | — | — | — | — | — |
| | C3 | — | — | — | — | — | — | — | — | — | — | — | — | — | — |
| Dyes | C.I. Direct Black 154 | — | — | 5 | — | — | — | — | — | — | — | — | — | — | — |
| | C.I. Direct Blue 199 | — | — | — | 5 | — | — | — | — | — | — | — | — | — | — |
| | C.I. Direct Red 227 | — | — | — | — | 5 | — | — | — | — | — | — | — | — | — |
| | C.I. Direct Yellow 86 | — | — | — | — | — | 5 | — | — | — | — | — | — | — | — |
| Alcohol | 2-Ethyl-1,3-hexanediol | — | — | — | — | — | — | 5 | 0.05 | 10.5 | 5 | 5 | 5 | 5 | 5 |
| | 2-Methyl-1-butanol | 2 | — | — | — | — | — | — | — | — | — | — | — | — | — |
| | Neopentyl alcohol | — | 2 | — | — | — | — | — | — | — | — | — | — | — | — |
| | 3,3-Dimethyl-butanol | — | — | 1 | 2 | — | — | — | — | — | — | — | — | — | — |
| | 2-Methyl-2,4-pentanediol | — | — | — | — | 5 | — | — | — | — | — | — | — | — | — |
| | 2,2,4-Trimethyl-1-pentanol | — | 2 | — | — | — | 5 | — | — | — | — | — | — | — | — |
| Humectant | Glycerin | — | — | 1 | — | — | 2 | — | — | — | — | — | — | — | — |
| | Diethylene glycol | 1 | — | — | — | 1 | — | — | — | — | 2 | — | — | — | — |
| | Triethylene glycol | — | — | — | — | — | — | — | — | — | — | — | — | 2 | — |
| | Trimethylolpropane | 8 | 12 | 12 | 12 | 8 | 8 | 8 | 8 | 8 | 4 | 8 | 8 | 6 | 8 |
| | 2-Pyrrolidone | 6 | 4 | 4 | 4 | 6 | 6 | 2 | 2 | 2 | 4 | 2 | 2 | 2 | 2 |
| | 1,2-Hexanediol | — | — | — | — | 3 | — | — | — | — | — | — | — | — | — |
| | 1,2-Octanediol | — | 1 | — | — | — | 1 | — | — | — | — | — | 1 | — | — |
| Penetrating organic solvent | Triethylene glycol monobutyl ether | — | — | — | — | — | 2 | — | — | — | — | — | — | 3 | — |
| | Diethylene glycol monobutyl ether | 2 | — | — | — | — | — | — | — | — | — | — | — | — | — |
| | iso-Propanol | — | 5 | — | 5 | — | 2 | — | — | — | — | 5 | — | — | 5 |
| | 2-Butanol | 3 | — | — | — | — | 1 | — | — | — | — | — | 3 | 2 | — |
| Acetylene surfactant | Surfynol 104 | 0.5 | 0.5 | 0.5 | — | 0.5 | 0.5 | 0.5 | 0.5 | 0.5 | 0.5 | — | — | — | 0.5 |
| | Surfynol 465 | 1 | — | — | — | 1 | — | — | — | — | 1 | — | — | — | — |
| Resin emulsion | Resin A | — | — | — | — | — | — | — | — | — | — | — | — | — | — |
| | Resin B | — | — | — | — | — | — | — | — | — | — | — | — | — | — |
| | Resin C | — | — | — | — | — | — | — | — | — | — | — | — | — | — |
| | Ultrapure water | Balance | Balance | Balance | Balance | Balance | Balance | Balance | Balance | Balance | Balance | Balance | Balance | Balance | Balance |

| | | Example | | | | | | | | | | | | |
|---|---|---|---|---|---|---|---|---|---|---|---|---|---|---|
| | | 29 | 30 | 31 | 32 | 33 | 34 | 35 | 36 | 37 | 38 | 39 | 40 | 41 | 42 |
| Ingredients | | Addition amount, wt % | | | | | | | | | | | | |
| Pigment dispersion | K1 | — | — | — | — | 30 | — | — | — | — | — | — | — | — | — |
| | C1 | — | — | — | — | — | 40 | — | — | — | — | — | — | 40 | — |
| | M1 | — | — | — | — | — | — | — | — | — | — | — | — | — | — |
| | Y1 | — | — | — | — | — | — | — | — | — | — | — | — | — | — |
| | K2 | — | — | — | — | — | — | 30 | — | — | — | — | — | — | 30 |
| | C2 | — | — | — | — | — | — | — | 40 | — | — | — | — | — | — |
| | M2 | 36 | — | — | — | — | — | — | — | — | — | — | — | — | — |
| | Y2 | — | 38 | — | — | — | — | — | — | — | — | — | — | — | — |
| | K3 | — | — | 30 | — | — | — | — | — | — | — | — | — | — | — |
| | C3 | — | — | — | 40 | — | — | — | — | — | — | — | — | — | — |

TABLE 1-continued

| | | | | | | | | | | | | | | | |
|---|---|---|---|---|---|---|---|---|---|---|---|---|---|---|---|
| Dyes | C.I. Direct Black 154 | — | — | — | — | — | — | — | — | 5 | — | — | — | — | — |
| | C.I. Direct Blue 199 | — | — | — | — | — | — | — | — | — | 5 | — | — | — | — |
| | C.I. Direct Red 227 | — | — | — | — | — | — | — | — | — | — | 5 | — | — | — |
| | C.I. Direct Yellow 86 | — | — | — | — | — | — | — | — | — | — | — | 5 | — | — |
| Alcohol | 2-Ethyl-1,3-hexanediol | 5 | 5 | 5 | 5 | 5 | 5 | 5 | 5 | 5 | 5 | 5 | 5 | 5 | — |
| | 2-Methyl-1-butanol | — | — | — | — | — | — | — | — | — | — | — | — | — | 2 |
| | Neopentyl alcohol | — | — | — | — | — | — | — | — | — | — | — | — | — | — |
| | 3,3-Dimethyl-butanol | — | — | — | — | — | — | — | — | — | — | — | — | — | — |
| | 2-Methyl-2,4-pentanediol | — | — | — | — | — | — | — | — | — | — | — | — | — | — |
| | 2,2,4-Trimethyl-1-pentanol | — | — | — | — | — | — | — | — | — | — | — | — | — | — |
| Humectant | Glycerin | — | — | — | — | — | — | — | — | — | — | — | — | — | — |
| | Diethylene glycol | — | — | — | — | — | — | 2 | — | — | — | 2 | — | — | 1 |
| | Triethylene glycol | — | — | — | 2 | — | 2 | — | — | — | — | — | — | 2 | — |
| | Trimethylolpropane | 8 | 8 | 8 | 6 | 8 | 6 | 4 | 8 | 8 | 8 | 4 | 8 | 6 | 8 |
| | 2-Pyrrolidone | 2 | 2 | 2 | 2 | 2 | 2 | 4 | 2 | 2 | 2 | 4 | 2 | 2 | 6 |
| | 1,2-Hexanediol | — | 5 | — | — | 1 | — | 3 | — | — | — | 3 | — | 3 | — |
| | 1,2-Octanediol | — | — | — | 0.5 | 1 | 0.5 | — | 1 | — | — | — | 1 | 0.5 | 1 |
| Penetrating organic solvent | Triethylene glycol monobutyl ether | — | — | 3 | — | — | — | — | — | — | — | — | 2 | — | — |
| | Diethylene glycol monobutyl ether | — | — | — | 3 | — | 2 | — | — | — | — | — | — | — | 2 |
| | iso-Propanol | — | — | — | 2 | — | 2 | — | 5 | — | 5 | — | 2 | 2 | — |
| | 2-Butanol | 5 | — | 2 | — | 3 | — | 3 | — | — | — | — | 1 | — | 3 |
| Acetylene surfactant | Surfynol 104 | 0.5 | 0.5 | 0.5 | 0.5 | — | 0.5 | 0.5 | 0.5 | 0.5 | — | 0.5 | 0.5 | 0.5 | 0.5 |
| | Surfynol 465 | 1 | — | — | 1 | 1 | — | 1 | — | — | 1 | — | — | 3 | 1 |
| Resin emulsion | Resin A | — | — | — | — | — | — | — | — | — | — | — | — | — | — |
| | Resin B | — | — | — | — | — | — | — | — | — | — | — | — | — | 3 |
| | Resin C | — | — | — | — | — | — | — | — | — | — | — | — | — | — |
| | Ultrapure water | Balance | Balance | Balance | Balance | Balance | Balance | Balance | Balance | Balance | Balance | Balance | Balance | Balance | Balance |

| | | Example | | | | | | Comparative Example | | |
|---|---|---|---|---|---|---|---|---|---|---|
| | | 43 | 44 | 45 | 46 | 47 | 48 | 1 | 2 | 3 |
| Ingredients | | Addition amount, wt % | | | | | | | | |
| Pigment dispersion | K1 | — | — | — | — | — | — | 30 | — | — |
| | C1 | — | — | — | — | — | — | — | — | — |
| | M1 | — | — | — | — | — | — | — | — | — |
| | Y1 | — | — | — | — | — | — | — | — | — |
| | K2 | — | — | — | — | — | — | — | — | — |
| | C2 | 40 | — | — | — | — | — | — | 40 | — |
| | M2 | — | — | — | 36 | 36 | 36 | — | — | — |
| | Y2 | — | — | — | — | — | — | — | — | — |
| | K3 | — | 30 | — | — | — | — | — | — | 30 |
| | C3 | — | — | — | — | — | — | — | — | — |
| Dyes | C.I. Direct Black 154 | — | — | — | — | — | — | — | — | — |
| | C.I. Direct Blue 199 | — | — | 5 | — | — | — | — | — | — |
| | C.I. Direct Red 227 | — | — | — | — | — | — | — | — | — |
| | C.I. Direct Yellow 86 | — | — | — | — | — | — | — | — | — |
| Alcohol | 2-Ethyl-1,3-hexanediol | 5 | — | 5 | — | — | — | — | — | — |
| | 2-Methyl-1-butanol | — | — | — | — | — | — | — | — | — |
| | Neopentyl alcohol | — | 2 | — | — | — | — | — | — | — |
| | 3,3-Dimethyl-butanol | — | — | — | — | — | — | — | — | — |
| | 2-Methyl-2,4-pentanediol | — | — | — | — | — | — | — | — | — |
| | 2,2,4-Trimethyl-1-pentanol | — | — | — | 5 | 5 | 5 | — | — | — |
| Humectant | Glycerin | — | — | — | 2 | 10 | 12 | — | — | — |
| | Diethylene glycol | — | — | — | — | — | — | — | — | — |
| | Triethylene glycol | — | — | — | — | — | — | — | — | — |
| | Trimethylolpropane | 8 | 12 | 8 | 6 | 12 | 12 | — | — | — |
| | 2-Pyrrolidone | 2 | 4 | 2 | 2 | 4 | 4 | 12 | 12 | — |
| | 1,2-Hexanediol | — | — | — | — | — | — | 4 | 4 | — |
| | 1,2-Octanediol | 1 | — | 1 | — | — | — | — | — | — |
| Penetrating organic solvent | Triethylene glycol monobutyl ether | — | 3 | 2 | — | — | — | — | — | 3 |
| | Diethylene glycol monobutyl ether | — | — | — | — | — | — | — | — | — |
| | iso-Propanol | 5 | — | 2 | — | — | — | — | — | — |
| | 2-Butanol | — | 2 | 1 | 5 | 5 | 5 | — | — | 2 |
| Acetylene surfactant | Surfynol 104 | 0.5 | 0.5 | 0.5 | 0.5 | 0.5 | 0.5 | 0.5 | — | 0.5 |
| | Surfynol 465 | — | — | — | 1 | 1 | 1 | — | — | — |
| Resin emulsion | Resin A | 2 | — | 3 | 3 | 3 | 3 | — | — | — |
| | Resin B | 2 | — | — | — | — | — | — | — | — |
| | Resin C | — | 3 | — | — | — | — | — | — | — |
| | Ultrapure water | Balance | Balance | Balance | Balance | Balance | Balance | Balance | Balance | Balance |

To examine the solubility of the ingredients of the ink, mixed solutions were prepared according to the same formulations as in the water-base inks of Examples 1 to 45 and Comparative Examples 1 to 3, except that the colorant component or the colorant component and the resin emulsion were not added. It was visually observed that the mixed solutions corresponding to Examples 1 to 45 were transparent and individual ingredients were fully dissolved. By contrast, it was visually observed that the mixed solutions corresponding to Comparative Examples 1 to 3 were cloudy.

<Evaluation>

(1) Evaluation of Ejection Stability

The water-base inks of Examples 1 to 45 and Comparative Examples 1 to 3 were loaded on an ink jet printer (PX-V700: manufactured by Seiko Epson Corporation). Xerox P (tradename, manufactured by FUJI XEROX OFFICE SUPPLY Co., Ltd.) of A4 size was provided as printing paper. Images comprising characters and full density blotted parts which are present together were continuously printed under an environment of 20 to 25° C./40 to 60% RH to visually inspect for defects such as ink droplet trajectory directionality problems and ink dot missing in images being printed. The results were evaluated according to the following criteria:

AA: Neither ink droplet trajectory directionality problems nor ink dot missing was observed in continuous printing of 200 sheets of printing paper.

A: Neither ink droplet trajectory directionality problems nor ink dot missing was observed in continuous printing of 100 sheets of printing paper.

B: Ink droplet trajectory directionality problems and ink dot missing occurred in less than 10 places in continuous printing of 100 sheets of printing paper.

C: Ink droplet trajectory directionality problems and ink dot missing occurred in not less than 10 places in continuous printing of 100 sheets of printing paper.

The results were as shown in Table 2 below.

(2) Evaluation of Print Equality on Plain Paper and Recycled paper

The water-base inks of Examples 1 to 45 and Comparative Examples 1 to 3 were loaded on an ink jet printer (PX-V700: manufactured by Seiko Epson Corporation). Printing conditions were set to "type of paper: plain paper, print quality: fine," and images were printed while varying filling density stepwise in 5% increments from 5% to 100%. The prints were evaluated for print quality (filled image quality) derived from uneven density of the prints. In this evaluation, Xerox Premium Multipurpose 4024 (tradename, manufactured by Xerox Corporation), Xerox P (tradename, manufactured by FUJI XEROX OFFICE SUPPLY Co., Ltd.), and Hammermill Copy Plus (tradename, manufactured by International Paper Company) were used as plain paper, and Xerox R (tradename, manufactured by FUJI XEROX OFFICE SUPPLY Co., Ltd.) was used as recycled paper. The quality of filled images was visually evaluated. Evaluation criteria are as follows.

AA: For all the filled images, uneven density was hardly observed.

A: For images of 100% filling density, uneven density was slightly observed although the uneven density was still on a level that poses no practical problem.

B: For images of not less than 50% filling density, uneven density was observed.

C: For all the filled images, uneven density was observed.

The results were as shown in Table 2 below.

(3) Evaluation of Color Development

The water-base inks of Examples 1 to 45 and Comparative Examples 1 to 3 were loaded on an ink jet printer (PX-V700: manufactured by Seiko Epson Corporation). Printing conditions were set to "type of paper: plain paper, print quality: fine," and images were printed at 100% filling density to determine print quality (O.D. value). In this evaluation, Xerox Premium Multipurpose 4024 (tradename, manufactured by Xerox Corporation), Xerox P (tradename, manufactured by FUJI XEROX OFFICE SUPPLY Co., Ltd.), and Hammermill Copy Plus (tradename, manufactured by International Paper Company) were used as plain paper, and Xerox R (tradename, manufactured by FUJI XEROX OFFICE SUPPLY Co., Ltd.) was used as recycled paper. The image quality was evaluated with a Gretag densitometer (manufactured by Gretag Macbeth). Evaluation criteria are as follows.

AA: O.D. value of not less than 1.0
A: O.D. value of not less than 0.95 and less than 1.0
B: O.D. value of not less than 0.90 and less than 0.95
C: O.D. value of less than 0.90

The results were as shown in Table 2 below.

TABLE 2

| | | Example | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Ejection stability | | AA | AA | B | AA | AA | AA | AA | AA | AA | AA | AA | AA | AA | AA |
| Quality of filled image | Xerox 4024 | A | B | A | AA | A | A | A | AA | AA | AA | AA | AA | AA | AA |
| | Xerox P | AA | A | A | AA | AA | AA | AA | AA | AA | AA | AA | AA | AA | AA |
| | Hammer mill | A | A | B | A | A | A | A | AA | A | AA | AA | A | AA | AA |
| | Xerox R | A | B | A | A | A | A | A | AA | AA | AA | AA | AA | AA | AA |
| O.D. value | Xerox 4024 | A | A | A | A | A | A | A | A | A | A | A | A | A | A |
| | Xerox P | B | B | B | A | B | B | A | B | B | A | B | A | B | A |
| | Hammer mill | B | B | B | B | B | B | B | B | B | B | B | B | B | B |
| | Xerox R | B | B | B | B | B | B | B | B | B | B | B | B | B | B |

| | | Example | | | | | | | | | | | | | |
|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| Ejection stability | | AA | AA | AA | AA | AA | AA | AA | AA | A | AA | AA | A | AA | AA |
| Quality of filled image | Xerox 4024 | AA | AA | A | A | AA | AA | A | A | A | AA | A | A | A | AA |
| | Xerox P | AA | AA | AA | A | AA | AA | A | AA | AA | AA | AA | AA | AA | AA |
| | Hammer | AA | AA | A | A | A | A | A | B | A | A | A | A | A | AA |

TABLE 2-continued

|  |  |  |  |  |  |  |  |  |  |  |  |  |  |  |  |
|---|---|---|---|---|---|---|---|---|---|---|---|---|---|---|---|
|  | Xerox R | AA | AA | A | A | AA | AA | A | A | A | A | A | A | A | AA |
| O.D. value | Xerox 4024 | A | A | A | A | A | A | A | A | A | A | A | A | A | A |
|  | Xerox P | B | B | B | A | A | A | A | A | A | A | A | A | A | A |
|  | Hammer mill | B | B | B | B | B | B | B | B | B | B | B | A | B | B |
|  | Xerox R | B | B | B | B | B | B | A | B | B | A | B | A | B | A |

|  |  | Example |  |  |  |  |  |  |  |  |  |  |  |  |  |
|---|---|---|---|---|---|---|---|---|---|---|---|---|---|---|---|
|  |  | 29 | 30 | 31 | 32 | 33 | 34 | 35 | 36 | 37 | 38 | 39 | 40 | 41 | 42 |
| Ejection stability |  | AA | AA | AA | AA | AA | AA | AA | AA | AA | AA | AA | AA | AA | AA |
| Quality of filled image | Xerox 4024 | AA | AA | AA | AA | AA | AA | AA | AA | A | A | AA | AA | AA | AA |
|  | Xerox P | AA | AA | AA | AA | AA | AA | AA | AA | AA | A | AA | AA | AA | AA |
|  | Hammer mill | A | AA | AA | A | AA | AA | AA | AA | A | A | A | A | AA | A |
|  | Xerox R | AA | AA | AA | AA | AA | AA | AA | AA | A | A | AA | AA | AA | AA |
| O.D. value | Xerox 4024 | A | A | A | A | A | A | A | A | A | A | A | A | AA | AA |
|  | Xerox P | A | A | A | A | A | A | A | A | A | A | A | A | A | AA |
|  | Hammer mill | B | B | A | A | B | B | A | B | A | B | B | A | A | A |
|  | Xerox R | A | A | A | A | A | A | A | A | A | A | A | A | A | A |

|  |  | Example |  |  | Comparative Example |  |  |
|---|---|---|---|---|---|---|---|
|  |  | 43 | 44 | 45 | 1 | 2 | 3 |
| Ejection stability |  | AA | AA | AA | A | A | C |
| Quality of filled image | Xerox 4024 | AA | AA | AA | B | B | A |
|  | Xerox P | AA | AA | AA | B | B | A |
|  | Hammer mill | AA | AA | A | C | B | B |
|  | Xerox R | AA | AA | AA | B | B | A |
| O.D. value | Xerox 4024 | AA | AA | AA | C | C | C |
|  | Xerox P | AA | AA | AA | B | B | B |
|  | Hammer mill | A | A | A | C | C | C |
|  | Xerox R | A | A | A | C | C | C |

As is apparent from the above results, for all the water-base inks of Examples 1 to 45, troubles such as ink droplet trajectory directionality problems and dot missing did not take place in continuous printing of 100 or more sheets, and printing was stable. In particular, for the water-base inks comprising a combination of specific alcohol, penetrating solvent, acetylene glycol surfactant, and humectant, troubles such as ink droplet trajectory directionality problems and dot missing did not occur even in continuous printing of 200 sheets, and the ejection stability was excellent.

For all the water-base inks of Examples 1 to 45, the quality of filled images was good independently of the type of recording media. On the other hand, for water-base inks of Comparative Examples 1 to 3, both the quality of characters and the quality of filled images were poor due to severe bleeding, and uneven density was observed.

Further, the resin emulsion-containing water-base inks of Examples of 41 to 45 advantageously have a marked effect of high O.D. values.

The invention claimed is:

1. A water-base ink composition comprising at least: a colorant component selected from dyes and pigments; a monovalent or divalent branched alcohol with C5 to C10 chain length; an acetylene glycol surfactant; a penetrating organic solvent; a humectant; and water, said monovalent or divalent branched alcohol with C5 to C10 chain length, said acetylene glycol surfactant, said penetrating organic solvent, and said humectant being selected from combinations of monovalent or divalent branched alcohols with C5 to C10 chain length, acetylene glycol surfactants, penetrating organic solvents, and humectants such that the water, said monovalent or divalent branched alcohol with C5 to C10 chain length, said acetylene glycol surfactant, said penetrating organic solvent, and said humectant are miscible with one another, wherein the content of the monovalent or divalent branched alcohol with C5 to C10 chain length in the ink is 0.1 to 10% by weight based on the total weight of the ink, the content of the acetylene glycol surfactant in the ink is 0.01 to 10% by weight based on the total weight of the ink, the penetrating organic solvent is selected from the group consisting of monohydric alcohols, glycol monoether derivatives of polyhydric alcohols, and 1,2-alkyldiols, the content of the monohydric alcohol in the ink is 0.5 to 10% by weight based on the total weight of the ink, the content of the glycol monoether derivative of polyhydric alcohol in the ink is 0.5 to 15% by weight based on the total weight of the ink, and the content of the 1,2-alkyldiol in the ink is 0.25 to 5% by weight based on the total weight of the ink, and wherein the monovalent or divalent branched alcohol with C5 to C10 chain length is 2-ethyl-1,3-hexanediol, and the humectant comprises a water-soluble humectant having a melting point of 30° C. or above.

2. The water-base ink composition according to claim 1, which further comprises a resin emulsion.

3. The water-base ink composition according to claim 2, wherein said resin emulsion has a glass transition temperature of 20° C. or above.

4. The water-base ink composition according to claim 2, wherein said ink has a viscosity of 5 to 20 cPs at 25° C.

5. The water-base ink composition according to claim 1, wherein said dye is selected from acid dyes, direct dyes, reactive dyes, and basic dyes.

6. The water-base ink composition according to claim 1, wherein said pigment is carbon black dispersed with the aid of a water soluble resin.

7. The water-base ink composition according to claim 1, wherein said pigment is an organic pigment dispersed with the aid of a water soluble resin.

8. The water-base ink composition according to claim 1, wherein said pigment is a surface treated pigment which has been surface modified and can be dispersed in ink without the aid of any dispersant.

9. The water-base ink composition according to claim 8, wherein said surface treated pigment is a surface treated carbon black.

10. The water-base ink composition according to claim 8, wherein said surface treated pigment is a surface treated organic pigment.

11. A method for ink jet recording, comprising the steps of: ejecting droplets of a water-base ink composition according to claim 1; and depositing the droplets onto a recording medium to perform recording.

12. A record produced by printing a water-base ink composition according to claim 1 by an ink jet recording method.

* * * * *